United States Patent Office 3,548,036
Patented Dec. 15, 1970

3,548,036
POLYMONOOLEFINS CONTAINING AN AMINE ANTISTATIC ADDITIVE DISPERSED THEREIN
Heinz Pohlemann, Limburgerhof, Pfalz, Helmut Christoph, Mannheim, and Alexander Stassen, Ludwigshafen (Rhine), Germany, assignors to Badische Anilin- & Soda-Fabrik Aktiengesellschaft, Ludwigshafen (Rhine), Germany
No Drawing. Continuation-in-part of application Ser. No. 319,702, Oct. 29, 1963. This application Jan. 6, 1967, Ser. No. 607,668
Claims priority, application Germany, Nov. 2, 1962, 1,469,848
Int. Cl. C08f 29/12, 29/04, 29/00
U.S. Cl. 260—897                                 8 Claims

ABSTRACT OF THE DISCLOSURE

A polymonoolefin containing dispersed therein as an antistatic agent a compound of the formula

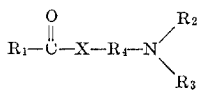

in which $R_1$ is alkyl or alkenyl of up to 40 carbon atoms, $R_2$ and $R_3$ are lower alkyl groups, $R_4$ is alkylene of up to 10 carbon atoms and X is one of the divalent radicals —O— and —NH—.

---

This application is a continuation-in-part application of our prior copending application, Ser. No. 319,702, filed Oct. 29, 1963 and now abandoned.

The problem of electrostatic charging of thermoplastic articles is quite well known and is particularly difficult to solve in the use of molded articles, films or the like made from polyolefins such as polyethylene and/or polypropylene. For example, one cannot merely apply to the surface of the polyolefin those antistatic agents which are currently used by industry for treating textile fibers or other surface applications, because the reduction in electrostatic charging even when effective is only temporary, and it is usually quite difficult to achieve a satisfactory application on the larger surfaces of molded or extruded articles. Since the polyolefins do not contain reactive groups or side chains, it is not feasible to apply a coating of an antistatic agent which is capable of reacting with the substrate to form a more permanent and durable antistatic finish.

Really durable effects with any thermoplastic material can only be achieved by incorporating into the material itself an antistatic agent which is capable of slowly migrating to the surface and will then free this surface of electrostatic charges for a long period of time. For example, it is known that vinyl chloride polymers can be rendered antistatic by the addition thereto of large amounts (about 20% by weight) of plasticizers having an antistatic action. However, no compounds of this type are known which are effective in small amounts and which can be used for all thermoplastic materials. Except in the case of plasticized polyvinyl chloride, the problem of preventing electrostatic charging of thermoplastic materials over a long period of time has not been effectively solved.

In order to achieve satisfactory results with polymonoolefins, the antistatic agent must not only be capable of being dispersed or incorporated into the thermoplastic material but it must also be capable of withstanding molding temperatures. Furthermore, it must be fully compatible with the polymonoolefin, i.e. it should not substantially alter the other desirable physical and chemical properties of the polymonoolefin such as lowering its heat distortion point or changing its gloss, hardness or color characteristics. Needless to say, it is extremely difficult to discover antistatic agents which are suitable as internal additives for polymonoolefins.

One object of this invention is to provide novel compositions, especially molding compositions and the products molded therefrom, of a polymonoolefin as the thermoplastic material containing as a substantially homogeneously dispersed antistatic additive certain amine compounds. Another object of the invention is to provide such compositions which can be readily molded, extruded or otherwise shaped at elevated temperatures without causing objectionable discoloration or otherwise adversely affecting the properties of the polymonoolefin. Still another object of the invention is to provide a polymonoolefin in which small amounts of an amine antistatic agent can be dispersed to yield good antistatic properties over a long period of time. These and other objects and advantages will become more apparent upon consideration of the following detailed specification.

It has now been found, in accordance with the present invention, that polymonoolefins distinguished by particularly advantageous antistatic properties are achieved by homogeneously incorporating or dispersing therein as an antistatic additive about 0.01 to 5% by weight, with reference to the polymonoolefin, of a compound of the formula

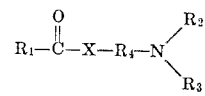

in which $R_1$ denotes a saturated or unsaturated aliphatic radical and especially a monovalent hydrocarbon radical selected from the class consisting of alkyl and alkenyl of 1 to 40 carbon atoms, preferably 3 to 20 carbon atoms and especially about 7 to 18 carbon atoms, $R_2$ and $R_3$ each denotes lower alkyl of 1 to 4 carbon atoms, especially methyl, $R_4$ denotes alkylene of 1 to 10 carbon atoms, preferably 2 to 6 carbon atoms, and X denotes one of the divalent radicals —O— and —NH—. The amides of this formula wherein $R_4$ is alkylene of two to six carbon atoms and especially two or three carbon atoms are preferred for molding compositions. The compounds employed as internal or admixed antistatic agents according to this invention may also be referred to as dialkylaminoalkylene amides or esters of fatty acids. Mixtures of these antistatic agents may also be used.

The monoolefin polymers include in particular the polymers of ethylene and propylene prepared by the conventional high and low pressure polymerization mthods. These have in general molecular weights of between 20,000 and 1,000,000, measured according to Uberreither, Makromolekulare Chemie, volumn 8 (1952) pages 21–28, and are film-forming polymers. Molding materials based on polyethylene having a density between 0.94 and 0.97 and a molecular weight between 50,000 and 1,000,000 and those based on polypropylene having a density between 0.890 and 0.910 and an intrinsic viscosity between $[\eta]=1$ and $[\eta]=5$, have proved to be particularly suitable.

Antistatic compounds which may be used according to the present invention are for example N-stearoyl-N'-dimethyltrimethylene diamine,
N-lauroyl-N'-dimethyltrimethylene diamine,
N-oenanthoyl-N'-dimethyltrimethylene diamine,
isobutyric (β-dimethylaminoethyl)-amide,
lauric (β-methylaminoethyl)-amide,
(β-dimethylaminoethyl) palmitate,
(β-dimethylaminopropyl) laurate, (β-dimethylaminoethyl) laurate,
(β-diethylaminoethyl) stearate,
N-lauroyl-N'-diethyl-α-methyltetramethylene diamine,
N-oleoyl-N'-dimethyltrimethylene diamine,
lauric (β-diisopropylaminoethyl)-amide,
N-oleoyl-N'-dibutyltrimethylene diamine and
montanic (α-dimethylaminopropyl)-amide.

By montanic acid we understand in the scope of the present invention mixtures of fatty acids having 26 to 30 carbon atoms. Such mixtures are commercially obtainable. The molding materials according to this invention preferably contain 0.1 to 2% by weight of the antistatic agent, with reference to the amount of the polymonoolefin.

The compounds useful as antistatic agents according to this invention may be prepared by prior art methods, for example by heating the particular fatty acid concerned with a dialkylaminoalkylenamine or dialkylamino alcohol to about 140° C. and distilling off the water formed or by reaction of acyl chlorides with dialkylaminoalkylenamines.

The antistatic additives may be incorporated into the thermoplastic polymonoolefins by mixing hot and under pressure. Efficient mixing of the polymonoolefin with the antistatic additive may be achieved on heated rollers of a rolling mill. The molding materials provided with antistatic substances may be processed for example by pressing, injection molding, extrusion, calendering or similar techniques which can also be used to melt blend or uniformly disperse the antistatic agent in the polymer. The polymonoolefin may also contain conventional additives, such as dyes, pigments, fillers, plasticizers, lubricants or natural or synethetic resins.

The invention is further illustrated by the following examples. The parts and percentages specified in the examples are parts and percentages by weight.

EXAMPLE 1

0.3 part of N-lauroyl-N'-dimethyltrimethylene diamine (LD) is mixed with 100 parts of polypropylene on mixing rolls at 190° C. Test specimens 3 mm. in thickness are pressed from the mixture. Similar specimens are prepared from pure polypropylene.

The test specimens are charged by being brushed fifty times with filter paper by means of a rotating rubbing appliance. The charge is determined with a commercial Statometer H 1,407 of the firm Herfurth, Hamburg-Altona. Surface resistance is determined on other test specimens. The values obtained are given in Table 1:

TABLE 1

| | Surface resistance, ohms | Charge, volts |
|---|---|---|
| Polypropylene without addition | >10$^{14}$ | 2,800 |
| Polypropylene with 0.3% of LD | 10$^{8}$ | 0–50 |

EXAMPLE 2

100 parts of polyethylene having a density of 0.960, which has been prepared by the low pressure method, is mixed on rollers with 0.5 part of (β-diethylaminoethyl) stearate (DS) and molded into test plates 3 mm. in thickness.

Surface resistance and charge are measured as described in Example 1. The values found are given in Table 2:

TABLE 2

| | Surface resistance, ohms | Charge, volts |
|---|---|---|
| Polyethylene without addition | >10$^{14}$ | 3,000 |
| Polyethylene with 0.5% of DS | 10$^{10}$ | 250 |

EXAMPLE 3

100 parts of polyethylene (density 0.918, prepared by the high pressure method) is mixed on a laboratory rolling mill with 1 part of an amide obtained by reaction of motanic acid (a mixture of $C_{26}$–$C_{30}$ fatty acids) and N,N-dimethylaminopropylamine. The mixture is molded into test plates 3 mm. in thickness. Surface resistance and charge are determined as described in Example 1. The values obtained are given in Table 3:

TABLE 3

| | Surface resistance, ohms | Charge, volts |
|---|---|---|
| Polyethylene without addition | >10$^{14}$ | 2,800 |
| Polyethylene with 1% of amide | 10$^{9}$ | 160 |

EXAMPLE 4

100 parts of polypropylene is mixed on mixing rolls at 190° C. with 0.6 part of N-oleoyl-N'-dimethyltrimethylene diamine (OD). Test plates 3 mm. in thickness are made from this mixture. Measurement of surface resistance and charge is carried out as in Example 1. The values obtained are given in Table 4:

TABLE 4

| | Surface resistance, ohms | Charge, volts |
|---|---|---|
| Polypropylene without addition | >10$^{14}$ | 2,800 |
| Polypropylene with 0.6% of OD | 10$^{9}$ | 100 |

EXAMPLE 5

In order to show that antistatic agents commonly used for the surface treatment of thermoplastic materials do not yield satisfactory results when attempting to incorporate them in a polymonoolefin, the following comparative tests have been carried out.

In each test, a commercial granulated polyethylene sold under the name "Lupolen 6011 white" was employed, this polymer having a mean molecular weight of 180,000 and a density of 0.960 g./cm.$^3$, and 0.1 g. of the antistatic agent listed in Table 5 was incorporated into 99.9 g. of the polyethylene. The substances were mixed on a conventional rolling mill for five minutes at 150° C. The rolled sheet thus obtained was cooled to 20° C. and then pressed for two minutes at 150° C. in a press at a pressure of 180 atm. into sheets 10 cm. square and 2 mm. thick. These sheets were stored for three days at 20° C. in a cabinet in which the atmospheric humidity was maintained at 46%. The surface resistance (ohms) and the static charge (volts) of the sheets were then determined under standard conditions. The resulting values are set forth in the following table:

TABLE 5

| Antistatic agent | Surface resistance, ohms | Static charge, volts |
|---|---|---|
| "D-Stat B"* | 0.7×10$^{13}$ | 1,700 |
| "Nopcone LV"* | 2×10$^{13}$ | 1,100 |
| "Merix Anti-Static 70 OL"* | 5×10$^{13}$ | 1,000 |
| "Statikil"* | 6.5×10$^{13}$ | 1,200 |
| "Plexiklar"* | 7×10$^{13}$ | 1,200 |
| 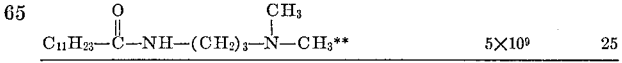 | 5×10$^{9}$ | 25 |

*Trademarks of commercial antistatic agents.
**N-lauroyl-N'-dimethyltrimethylene diamine.

EXAMPLE 6

The same procedure was followed as in Example 5 except that in each case 0.5 g. of the antistatic agent was incorporated into 99.5 g. of the polyethylene. The results are shown in the following table:

TABLE 6

| Antistatic agent | Surface resistance, ohms | Static charge, volts |
|---|---|---|
| "D-Stat B" | 1×10¹¹ | 400 |
| "Nopcone LV" | 1.5×10¹³ | 800 |
| "Merix Anti-Static 79 OL" | 5×10¹³ | 500 |
| "Statikil" | 2×10¹³ | 200 |
| "Plexiklar" | 5×10¹³ | 500 |
| $C_{11}$—$H_{23}$—$\overset{\overset{O}{\|}}{C}$—NH—$(CH_2)_3$—$\overset{\overset{CH_3}{\|}}{N}$—$CH_3$ | 1×10⁹ | 0 |

EXAMPLE 7

In another series of comparative tests, there was used a commercial, granulated polypropylene sold under the name "Luparen 151 white," this polymer having an intrinsic viscosity of 2.8, a mean molecular weight of 500,000 and a density of 0.905 g./cm.³

In each test, 0.1 g. of the antistatic agent as listed in Table 7 were incorporated into 99.9 g. of the polypropylene. The substances were mixed on a conventional rolling mill for five minutes at 175° C. The rolled sheet obtained thereby was cooled to 20° C. and then subjected to a pressure of 180 atm. at 175° C. for two minutes in a press and pressed into sheets 10 cm. square and 2 mm. thick. These sheets were stored for three days at 20° C. in a cabinet maintained at an atmospheric humidity of 46%. The surface resistance and static charge were then determined as in the preceding two examples with the following results:

TABLE 7

| Antistatic agent | Surface resistance, ohms | Static charge, volts |
|---|---|---|
| "D-Stat B" | 2×10¹³ | 600 |
| "Nopcone LV" | 2×10¹³ | 400 |
| "Merix Anti-Static 79 OL" | 5×10¹⁴ | 200 |
| "Statikil" | 1×10¹⁴ | 400 |
| "Plexiklar" | 2×10¹⁴ | 900 |
| $C_{11}H_{23}$—$\overset{\overset{O}{\|}}{C}$—NH—$(CH_2)_3$—$\overset{\overset{CH_3}{\|}}{N}$—$CH_3$ | 1×10¹⁰ | 20 |

EXAMPLE 8

The same procedure and materials were used as in Example 7 except that 0.5 g. of the antistatic agent were incorporated into 99.5 g. of the polypropylene. The following results were obtained:

TABLE 8

| Antistatic agent | Surface resistance, ohms | Static charge, volts |
|---|---|---|
| "D-Stat B" | 1×10¹³ | 400 |
| "Nopcone LV" | 2×10¹³ | 100 |
| "Merix Anti-Static 79 OL" | 5×10¹³ | 100 |
| "Statikil" | 2×10¹³ | 400 |
| "Plexiklar" | 2×10¹³ | 350 |
| $C_{11}H_{23}$—$\overset{\overset{O}{\|}}{C}$—NH—$(CH_2)_3$—$\overset{\overset{CH_3}{\|}}{N}$—$CH_3$ | 5×10⁹ | 0 |

It will be readily apparent from these series of comparative tests that antistatic agents commonly used for the surface treatment of various thermoplastic material do no give the same effective results as the particular antistatic agent of the present invention when incorporated or blended into polyethylene or polypropylene as a molding material. Surprisingly, the amine compounds employed herein do give excellent results under these conditions even when used in amounts of less than 1% by weight with reference to the polymonoolefin.

The invention is hereby claimed as follows:

1. A thermoplastic composition comprising a polymonoolefin containing dispersed therein as an antistatic additive about 0.01 to 5% by weight of a compound of the formula

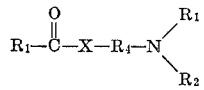

in which $R_1$ denotes a hydrocarbon radical selected from the class consisting of alkyl and alkenyl of 1 to 40 carbon atoms, $R_2$ and $R_3$ each denotes lower alkyl of 1 to 4 carbon atoms, $R_4$ denotes alkylene of 1 to 10 carbon atoms and X denotes a divalent radical selected from the class consisting of —O— and —NH—.

2. A composition as claimed in claim 1 wherein said antistatic additive is present in an amount of about 0.1 to 2% by weight with reference to the polymonoolefin.

3. A composition as claimed in claim 1 wherein the polymonoolefin is a polymer selected from the class consisting of polyethylene, polypropylene and mixtures thereof.

4. A composition as claimed in claim 1 wherein the antistatic agent is a compound of the formula

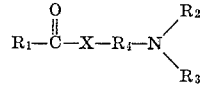

in which $R_1$ denotes a hydrocarbon radical selected from the class consisting of alkyl and alkenyl of 3 to 20 carbon atoms, $R_2$ and $R_3$ each denotes lower alkyl of 1 to 4 carbon atoms, $R_4$ denotes alkylene of 2 to 6 carbon atoms and X denotes a divalent radical selected from the class consisting of —O— and —NH—.

5. A composition as claimed in claim 1 wherein said antistatic additive is N-lauroyl-N'-dimethyltrimethylene diamine.

6. A composition as claimed in claim 5 wherein said polymonoolefin is a polymer selected from the class consisting of polyethylene, polypropylene and mixtures thereof.

7. A composition as claimed in claim 6 wherein said antistatic additive is present in an amount of about 0.1 to 2% by weght with reference to the polymonoolefin.

8. A composition as claimed in claim 6 wherein said polymonoolefin has a molecular weight between 20,000 and 1,000,000, the polyethylene having a density between 0.94 and 0.97 g./cm.³ and the polypropylene having a density between 0.890 and 0.910 g./cm.³

References Cited

UNITED STATES PATENTS

| 2,921,048 | 1/1960 | Bell et al. | 260—45.9 |
| 2,525,691 | 10/1950 | Lee et al. | 260—31.4 |
| 3,190,763 | 6/1965 | Schleepe et al. | 106—186 |
| 2,403,960 | 7/1946 | Stoops et al. | 117—139.5 |
| 3,211,646 | 10/1965 | Berger | 252—8.8 |

JOSEPH L. SCHOFER, Primary Examiner

S. M. LEVIN, Assistant Examiner

U.S. Cl. X.R.

260—93.7, 94.9

PO-1050
(5/69)

UNITED STATES PATENT OFFICE
CERTIFICATE OF CORRECTION

Patent No. 3,548,036        Dated December 15, 1970

Inventor(s) Heinz Pohlemann et al

It is certified that error appears in the above-identified patent and that said Letters Patent are hereby corrected as shown below:

Column 2, line 70, "lauric ($\beta$-methylaminoethyl)-amide" should read -- lauric ($\beta$-dimethylaminoethyl)-amide --.

Column 6, claim 1, that portion of the formula reading

" 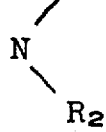  "  should read --  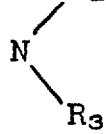 --.

SIGNED AND
SEALED
MAR 9 1971

(SEAL)
Attest:

Edward M. Fletcher, Jr.
Attesting Officer

WILLIAM E. SCHUYLER, JR.
Commissioner of Patents